United States Patent
LeMeur, Jr. et al.

(10) Patent No.: US 8,499,414 B1
(45) Date of Patent: Aug. 6, 2013

(54) SPRING MEMBER FOR INDUSTRIAL CASTER WHEEL

(75) Inventors: Henri E. LeMeur, Jr., Warren, PA (US); Philip M. Downey, Tidioute, PA (US); Timothy W. Rowles, Youngsville, PA (US)

(73) Assignee: Superior Tire & Rubber Corp., Warren, PA (US)

(*) Notice: Subject to any disclaimer, the term of this patent is extended or adjusted under 35 U.S.C. 154(b) by 296 days.

(21) Appl. No.: 13/085,640

(22) Filed: Apr. 13, 2011

(51) Int. Cl.
  *B60B 33/04* (2006.01)
(52) U.S. Cl.
  USPC .......................................... 16/44; 16/19; 16/24
(58) Field of Classification Search
  USPC ................ 16/19, 21, 24, 26, 36, 44, DIG. 36; 267/189, 201, 257
  See application file for complete search history.

(56) References Cited

U.S. PATENT DOCUMENTS

| | | | | |
|---|---|---|---|---|
| 1,552,790 A | * | 9/1925 | Zinsitz | 267/257 |
| 2,442,831 A | * | 6/1948 | Suttles | 16/44 |
| 4,260,177 A | * | 4/1981 | Pflughaupt et al. | 280/124.155 |
| 4,346,498 A | * | 8/1982 | Welsch et al. | 16/44 |
| 4,485,521 A | * | 12/1984 | Welsch et al. | 16/44 |
| 4,559,669 A | * | 12/1985 | Bonzer et al. | 16/44 |
| 5,809,612 A | * | 9/1998 | Finch | 16/35 D |
| 7,065,828 B2 | * | 6/2006 | Sorensen | 16/45 |
| 7,284,299 B2 | * | 10/2007 | Ruckman et al. | 16/31 R |
| 2004/0000025 A1 | * | 1/2004 | LeMeur et al. | 16/44 |
| 2004/0055108 A1 | * | 3/2004 | Lemeur et al. | 16/44 |

* cited by examiner

*Primary Examiner* — Roberta Delisle
(74) *Attorney, Agent, or Firm* — Stephen J. Roe

(57) ABSTRACT

A spring-force-adjustable and height-adjustable industrial caster wheel includes spring assembly, a mounting plate, a swivel assembly that swivels relative to the mounting plate, and a spring housing having a spring space in which the spring assembly is located. The spring force of the spring assembly is adjustable by pre-loading the spring assembly along the top-to-bottom direction along which the caster load is applied. The spring assembly includes a spring member having one or more relief areas on one or more of its side and/or end surfaces and/or internally within the spring member. These one or more relief areas allow the spring member to easily deform under the pre-load force or under increasing caster load forces without compromising the ability of the spring space to constrain lateral movements of the spring assembly or the ability of the spring member to deform elastically and/or avoid undergoing plastic deformations.

20 Claims, 7 Drawing Sheets

SPRING MEMBER FOR INDUSTRIAL CASTER WHEEL

BACKGROUND OF THE INVENTION

1. Field of Invention

The invention relates to industrial caster wheels.

2. Description of Related Art

Industrial caster wheels are used, for example, as stabilizer casters on a pallet truck. Typical pallet trucks have a single drive wheel and one industrial caster wheel located at each corner. Usually, each industrial caster wheel has a spring member that absorbs shocks while traveling. The spring member also provides stability as the object to which the height-adjustable industrial caster wheel is attached travels over rough surfaces. U.S. Pat. Nos. 6,425,161 and 7,093,319, and pending U.S. Patent Applications (13/085,535 and 13/085,593, filed herewith), each incorporated herein by reference in its entirety, disclose industrial caster wheels having elastomeric spring members.

Pallet trucks are used for a variety of tasks, such as moving pallets between a loading dock and a shipping container or semi trailer or between the loading dock to a storage or redistribution location. When a pallet truck is used to move pallets from the loading dock into the shipping container or semi trailer or from the shipping container or semi trailer onto the loading dock, the operator typically runs the pallet truck at low speeds, due to the limited spaces in the shipping container or semi trailer and/or the loading dock and the typical height offsets between the surface of the loading dock and bottom surface of the shipping container or semi trailer.

The operator's primary concern is to avoid damaging or dislodging any of the goods placed on the pallet as the pallet is being moved. As a result of these considerations, the spring-force adjustable and/or height-adjustable industrial caster wheels are typically set to provide a relatively soft spring force and to allow the pallet truck to move over uneven surfaces while maintaining the pallet as steady and horizontal as possible.

In contrast, after a given pallet has been moved onto the loading dock, other pallet trucks are used to move the pallet to a storage location, a redistribution location and/or another loading dock. For example, upon receiving a number of pallets from a manufacturer at an inbound loading dock of a warehouse, each containing the same goods, some of those pallets may be immediately transferred to a number of outbound loading docks, with each pallet being moved to a different loading dock for shipping to a different retail store. Other ones of those pallets may be moved to storage shelves, where they will be stored until they are shipped to the various retail stores. In another example, those pallets may be moved to a redistribution location, where the various goods are unloaded from the pallets and either placed into storage or repalletized with other goods from other manufacturers and/or other goods from the same manufacturer for delivery to a single retail store.

In these cases, the pallet trucks typically move on a smooth, even floor of the warehouse. The operator's primary concern is to move the pallets as rapidly as possible without tipping over or damaging or dislodging any of the goods placed on the pallet. Thus, the operators run the pallet trucks at high speeds along defined paths. These paths unavoidably include turns, sharp corners and/or moving from one path to another. As a result of these considerations, the spring-force adjustable and/or height-adjustable industrial caster wheels are typically set to provide a relatively stiff spring force and/or to allow the pallet truck to take high-speed turns over relatively even surfaces while avoiding tipping the pallet truck over and/or maintaining the pallet as steady and horizontal as possible.

Typically, a warehouse will employ a large number of pallet trucks, some of which will be used to move pallets between the loading docks and shipping containers and/or semi trailers, others of which will be used to move pallets between the loading docks, storage locations and/or redistribution locations, and still others of which are in a repair bay or the like for repairs or other maintenance. Some such repairs or other maintenance actions include replacing worn drive wheels and/or worn industrial casters.

SUMMARY OF THE INVENTION

In response to a given pallet truck breaking down and needing to be pulled off-line and sent to the repair bay, it is not uncommon for another pallet truck to be moved from a loading/unloading task to a transfer task or vice-versa. This can also occur when additional pallet trucks are needed to deal with higher than normal amounts of inbound or outbound goods or to deal with higher than normal amounts of goods needing to be transferred between loading docks, storage locations, redistribution locations and the like. In this case, it is typically necessary to adjust the spring stiffness of the height-adjustable industrial caster wheel and may be necessary or desirable to adjust the height of the caster wheel to the different use.

In the spring-force adjustable and/or height-adjustable industrial caster wheels disclosed in the incorporated 161 and 319 patents, the spring-force adjustment direction for the spring member is at a substantial angle to the direction the force is applied to the spring member. In the exemplary embodiments illustrated in the 161 and 319 patents, this direction is close to 90°, ±15°. Because the adjustment axis is at a substantial angle relative to the applied force axis in these embodiments, the shape and structure of the spring member has relatively little effect on the performance of the spring member.

In contrast, in the spring-force adjustable and/or height-adjustable industrial caster wheels disclosed in the incorporated (Ser. No. 13/085,535 and Ser. No. 13/085,593) pending patent applications, the spring-force adjustment direction for the spring member is essentially aligned with the direction the force is applied to the spring member. That is, in the exemplary embodiments illustrated in the (Ser. No. 13/085,535 and Ser. No. 13/085,593) pending patent applications, both the spring-force adjustment force and the applied force are applied to the spring member through a vertical (i.e., top-to-bottom) direction or dimension of the spring member. Because the adjustment force axis is the same as, or closely aligned with, the applied force axis in these embodiments, the shape and structure of the spring member has a substantial effect on the performance of the spring member.

In particular, in the exemplary embodiments illustrated in the (Ser. No. 13/085,535 and Ser. No. 13/085,593) pending patent applications, the spring member is located within a space or chamber in the caster body that closely matches the spring member in shape and size. This constrains the spring member and limits its ability to move laterally relative to both the spring force adjustment member and to the spring member caster axel that transmits force between the caster wheel and the caster body. Without constraining the spring member in this way, it would be difficult, if not impossible, to ensure the desired spring force is provided between the caster body and the spring member caster wheel, due to the spring member being able to shift relative to either the spring force adjustment member and/or the spring member caster axel.

However, whether the spring force adjustment member applies a preload force to the spring member and/or the spring member caster axel applies a static and/or dynamic force to the spring member as the load supported by the device to which the caster is attached changes and/or the caster travels over a varying surface, the spring member responds by deforming, i.e., shortening in the vertical or top-to-bottom direction, as the load increases and by returning to it's original shape, i.e., lengthening in the vertical or top-to-bottom direction, as the load decreases. Because the elastomeric material the spring member is formed of is essentially incompressible, shortening and lengthening the spring member in that top-to-bottom direction or dimension requires that the spring member increase or decrease, respectively, in one or both of the lateral, i.e., front-to-back or side-to-side, directions or dimensions of the spring member to maintain the same volume.

As outlined above, it is necessary to closely constrain the lateral movement of the spring member. Consequently, for the simple block-style spring members disclosed in the incorporated 161 and 319 patents, there is typically insufficient unoccupied space in the spring member space in the caster body, in one or both of these lateral directions or dimensions, for the needed increase in the spring member's lateral dimensions as the spring member shortens along the vertical or top-to-bottom direction in response to increases in the applied load. Therefore, providing relief areas in the spring member that allow increases in one or both of the spring member's lateral dimensions, while the spring member remains closely constrained along one or both lateral directions by the spring member space, is desirable.

This invention provides an improved spring member for a spring-force-adjustable industrial caster wheel.

This invention separately provides an improved spring member for a spring-force-adjustable industrial caster wheel where the spring-force-adjusting mechanism applies the spring force adjustment force to the spring member in a direction that is at least close to an applied force direction of the spring-force-adjustable industrial caster wheel.

This invention separately provides an improved spring member for a spring-force-adjustable industrial caster wheel where both the spring-force-adjustment force and the applied load are applied to a top-to-bottom direction of the spring member.

This invention separately provides an improved spring member for a spring-force-adjustable industrial caster wheel that has the spring-force-adjusting mechanism located at a top surface of the spring-force-adjustable industrial caster wheel.

This invention separately provides an improved spring member for a spring-force-adjustable industrial caster wheel tightly laterally contains the spring member within a spring space of the spring-force-adjustable industrial caster wheel.

In various exemplary embodiments of an improved spring member for a spring-force-adjustable industrial caster wheel according to this invention, the improved spring member includes one or more relief areas where the material forming the spring member has been removed and where the remaining material forming the spring member can extend laterally when the load applied to the top-to-bottom direction of the spring member increases and thus shortens or reduces the top-to-bottom dimension of the spring member. In various exemplary embodiments, the improved spring member includes one or more relief areas provided in one or more outer lateral surfaces of the improved spring member. In some such exemplary embodiments, the relief areas are provided on opposite outer lateral surfaces of the improved spring member. In various ones of such exemplary embodiments, the relief areas have long dimensions that extend between the top and bottom surfaces and/or along the top-to-bottom direction. In various other ones of such exemplary embodiments, the relief areas have long dimensions that extend between the adjacent lateral surfaces and/or along the end-to-end or side-to-side directions.

In various other exemplary embodiments, the one or more relief areas comprise relief spaces or voids within an interior of the improved spring member. In various ones of such exemplary embodiments, the spaces or voids forming the relief areas have long dimensions that extend between the top and bottom surfaces and/or along the top-to-bottom direction. In various other ones of such exemplary embodiments, the relief spaces or voids forming the relief areas have long dimensions that extend between the adjacent lateral surfaces and/or along the end-to-end or side-to-side directions. In yet other exemplary embodiments, the one or more relief areas comprise both relief spaces and/or voids within an interior of the improved spring member and relief areas provided in one or more outer lateral surfaces of the improved spring member.

In various exemplary embodiments, the industrial caster wheel assembly includes a mounting plate and a spring housing assembly that rotates relative to the mounting plate. In various exemplary embodiments, a bolt extends into the spring housing assembly and engages a spring assembly of the spring housing assembly. The spring assembly is held within a spring space formed within the spring housing assembly and includes a spring member, a first contact plate and a second contact plate. The bolt contacts the first contact plate, while the second contact plate rests on a spring axel. The spring axel extends between and fastens together two side plates between which the caster wheel is attached. The spring member is deformable along the top-to-bottom direction between the first and second contact plates to dampen any changes in the surface the caster wheel moves over and/or to dampen any changes in load applied to the mounting plate.

The bolt is positioned within a threaded passage that extends through a top surface of the spring housing assembly into the spring space. The bolt extends through a bottom opening of this threaded passage to engage the first contact plate, which is located on or over a top surface of the spring member. The bolt includes a drive structure in or on its top surface, such that the spring force of the spring member can be adjusted by screwing the bolt further into or by unscrewing the bolt so it is less deep into the threaded passage. As the bottom end of the bolt extends past the bottom opening of the threaded passage and is moved away from or towards that bottom opening, the spring assembly is more or less pre-loaded, and thus pre-deformed, by the bolt pressing against the first or top contact plate, increasing or decreasing the effective spring force of the spring member. The one or more relief areas allow the spring member to easily deform under the pre-load force or under increasing caster load forces without compromising the ability of the spring space to constrain lateral movements of the spring assembly or the ability of the spring member to elastically deform.

These and other features and advantages of this invention are described in or are apparent from the following detailed description of the preferred embodiments.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

Figure 1:
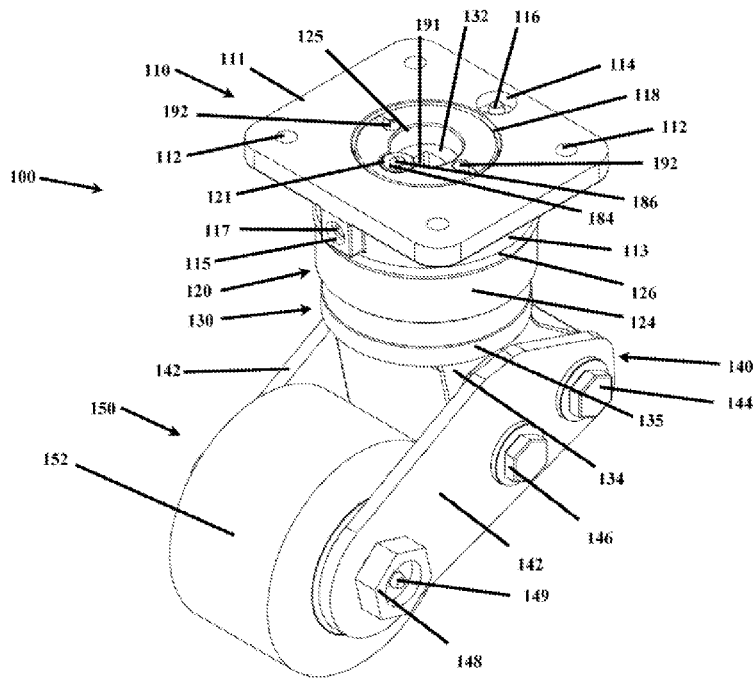
FIG. 1 is an isometric view of a first exemplary embodiment of a spring-force-adjustable industrial caster wheel according to this invention.
Figure 12:
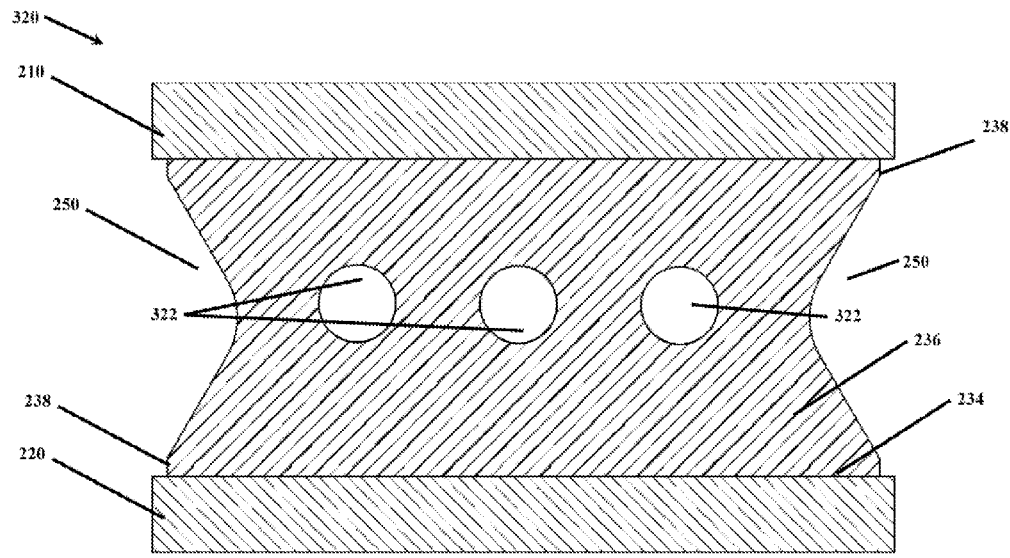
FIGS. 9-12 are vertical cross-sectional views through other exemplary embodiments of a spring-force-adjustable spring member according to this invention.
Figure 2:
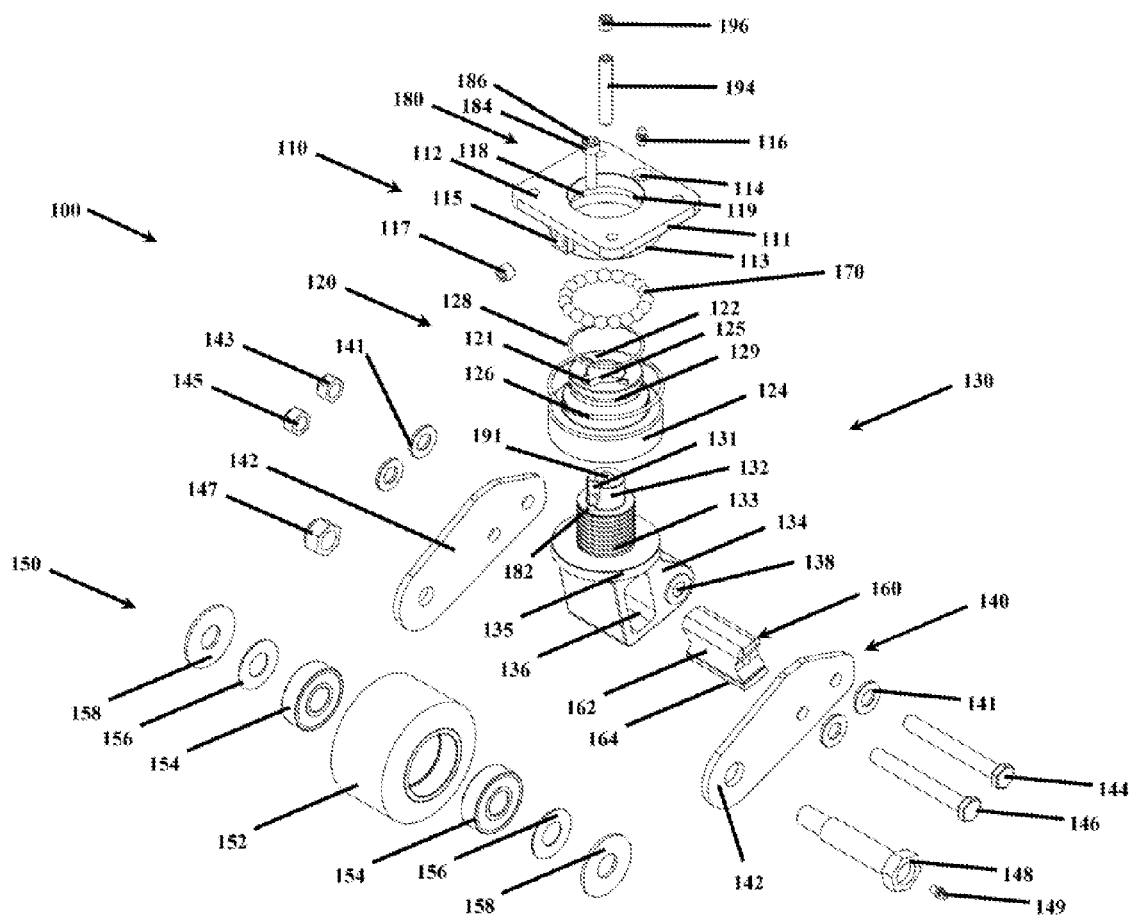
FIG. 2 is an exploded view of the spring-force-adjustable and height-adjustable industrial caster wheel shown in FIG. 1.
Figure 3:
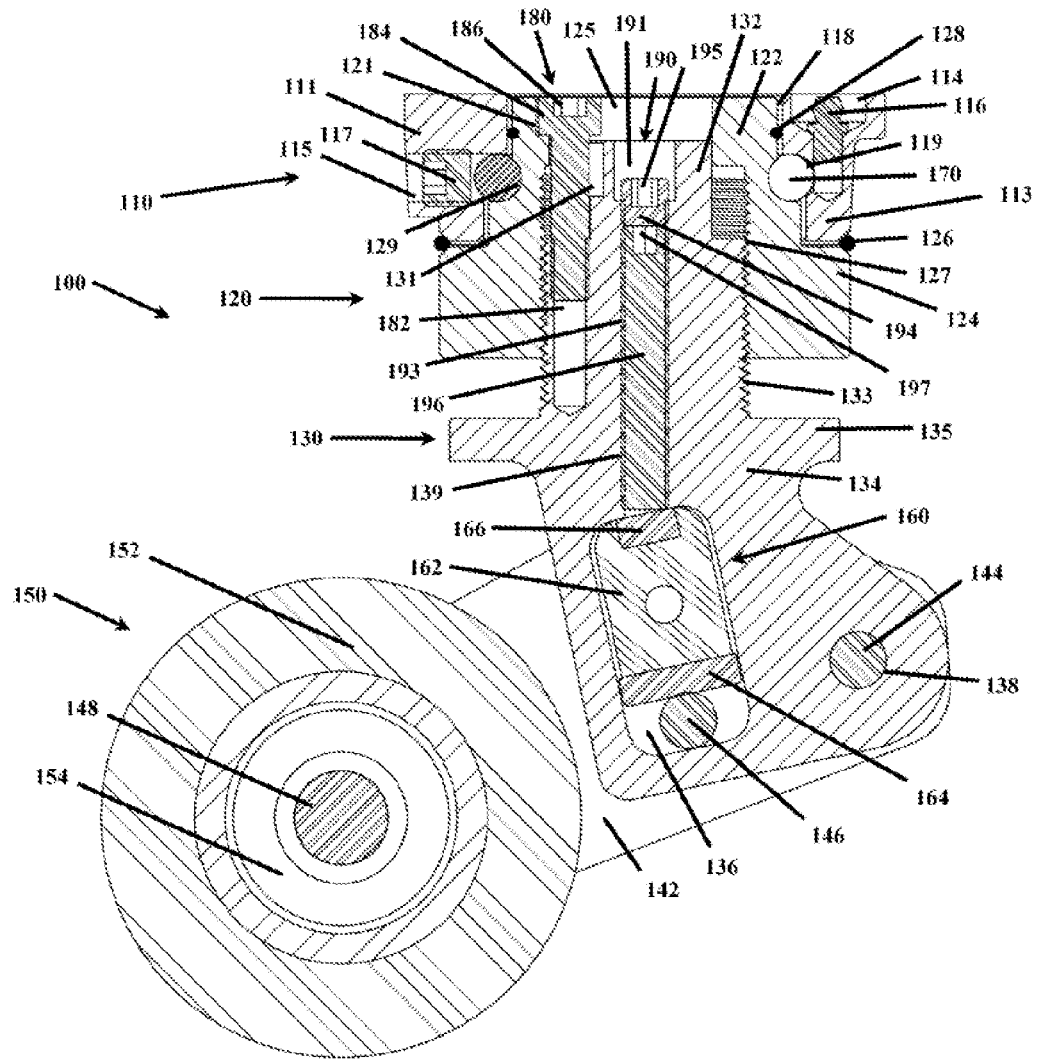
FIG. 3 is a vertical cross-sectional view through the spring-force-adjustable and height-adjustable industrial caster wheel shown in FIG. 1.

FIGS. 1-3 illustrate a first exemplary embodiment of a spring-force-adjustable and height-adjustable industrial caster wheel 100 according to this invention. As shown in FIGS. 1-3, the spring-force-adjustable and height-adjustable industrial caster wheel 100 includes a mounting base 110, a swivel assembly 120, a spring-force-adjustable and height-adjustable spring housing 130, a side plate assembly 140 and a caster wheel assembly 150. As shown in varying levels of detail in FIGS. 1-11, the mounting base 110 includes a top mounting plate 111. A plurality of holes 112 are provided in the top mounting plate 111 and are usable to mount the mounting base 110 to an object, such as a pallet truck. The mounting base 110 also includes a small first recess 114 and a larger central passage 118 in the top mounting plate 111. A lubrication fitting 116 is screwed into the internally threaded first recess 114.

As shown in FIGS. 1-3, an annular bottom member 113 of the mounting base 110 extends downwardly away from the top mounting plate 111. The outer surface of the annular bottom member 113 is typically cylindrical, although it can be any appropriate shape. A ball bearing passage 115 extends horizontally through the annular bottom member 113. A plug screw 117 is screwed into the internally-threaded ball bearing passage 115. An annular top portion 122 of the swivel assembly 120 extends upwardly into the interior space defined by the annular bottom member 113, while an annular bottom portion 124 of the swivel assembly 120 is separated from the bottom portion 113 by an O-ring 126.

A top portion 132 of the spring-force-adjustable and height-adjustable spring housing 130 extends upwardly inside of the annular bottom portion 113 and the annular top and bottom portions 122 and 124 of the swivel assembly 120, and is connected to the swivel assembly 120. A bottom portion 134 of the spring-force-adjustable and height-adjustable spring housing 130 houses an elastomeric spring member assembly 160 and provides a mounting structure for the side plate assembly 140. A flange 135 extends outwardly from the spring-force-adjustable and height-adjustable spring housing 130 between the top and bottom portions 132 and 134.

As shown in FIGS. 1-3, the side plate assembly 140 includes a pair of side plates 142 that are fastened to the bottom portion 134 of the spring-force-adjustable and height-adjustable spring housing 130. The side plates 142 also carry the caster wheel assembly 150. In particular, a first fastener 144 extends through a first set of holes or passages provided in the side plates 142 and a hole or passage provided in the bottom portion 134 of the spring-force-adjustable and height-adjustable spring housing 130. The first fastener 144 is connected to a first nut or other securing device 143 to securely fasten the side plates 142 together. The first fastener 144 also forms an axel or pivot point around which the side plate assembly 140 can rotate in response to the caster wheel 150 travelling over uneven surfaces, across thresholds and other bumps, dips and the like, and/or in response to changes in the load placed on the spring-force-adjustable and height-adjustable industrial caster wheel 100.

A second fastener 146 extends through a second set of holes or passages provided in the side plates 142 and through a spring member chamber provided within the bottom portion 134 of the spring-force-adjustable and height-adjustable spring housing 130. The second fastener 146 is located so that it is adjacent to the elastomeric spring member assembly 160. The second fastener 146 is connected to a second nut or other securing device 145 to secure it to the side plates 142. The second fastener 146 bears against the elastomeric spring member assembly 160 and deforms and releases the elastomeric spring member assembly 160 as the side plate assembly 140 rotates around the first fastener 144 and thus forms a spring axel that applies a load between the caster wheel 150 and the spring assembly 160

A third fastener 148 extends through a third set of holes or passages provided in the side plates 142 and through a hole or passage provided through a center of the caster wheel assembly 150. The third fastener 148 is connected to a third nut or other securing device 147 to secure it and the caster wheel assembly 150 to the side plates 142. In particular, the third fastener 148 forms an axel or pivot point around which the caster wheel assembly 150 can rotate. A lubrication fitting 149 is provided in one end of the third fastener 148 to allow the caster wheel assembly 150 to be easily lubricated without having to disassemble the industrial caster wheel 110 or remove it from the pallet truck or other object it is attached to.

Figure 7:
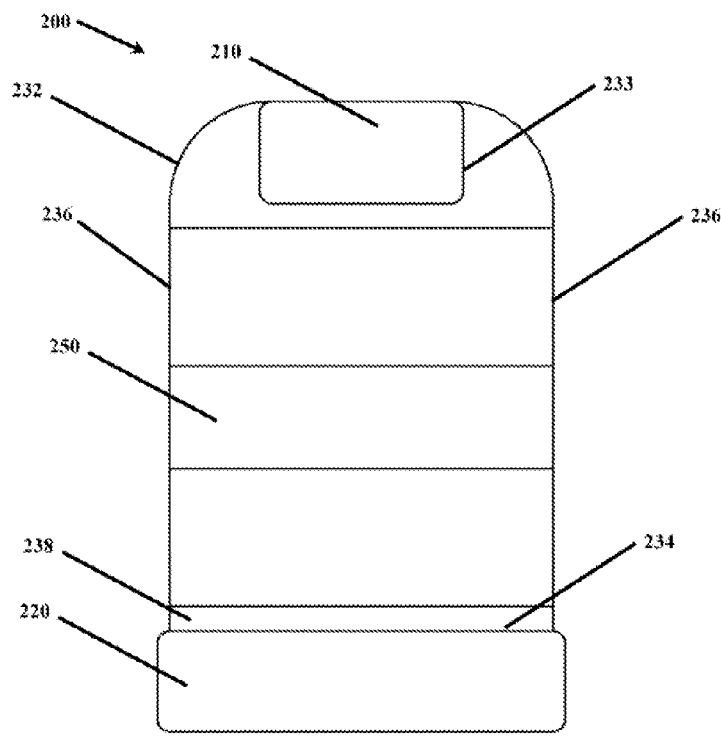
FIG. 7 is an end plan view of the spring-force-adjustable spring member shown in FIG. 4.

FIG. 3 shows a fully exploded view of the spring-force-adjustable and height-adjustable industrial caster wheel 100 shown in FIGS. 1 and 2. As shown in FIG. 3, the mounting base 110 rests on top of and extends around the annular top portion, i.e., a swivel bearing member, 122 of the swivel assembly 120. In particular, the swivel-bearing member 122 extends into the central passage 118, which extends through both the top mounting plate 111 and the annular bottom member 113. A channel 119 is formed in the inner surface of the central passage 118, while a corresponding channel 129 is formed in the outer surface of the swivel-bearing member 122. As shown in FIG. 7, when the swivel-bearing member 122 is inserted into the central passage 118, the two channels 119 and 129 face each other and form a bearing race. When a number of ball bearings 170, sufficient to fill the bearing race, are inserted through the ball bearing passage 115, the swivel-bearing member 122 is locked into the central passage 118, such that the swivel assembly 120 is secured to the mounting base 110. The ball bearings 170 are then secured into the bearing race by screwing the plug screw 117 into the ball bearing passage 115.

The ball bearings 170 allow the swivel assembly 120 to rotate freely relative to the mounting base 110 about a vertical axis. The first O-ring 126 and a second O-ring 128 are also located between the swivel-bearing member 122 and the central passage 118. The first and second O-rings 126 and 128 seal the gap between the swivel bearing member 122 and the central passage 118, ideally preventing any lubrication for the ball bearings 170, which may be inserted into the gap through the lubrication fitting 116, from escaping from the gap.

As indicated above, the top portion 132 of the spring-force-adjustable and height-adjustable spring housing 130 extends into the swivel-bearing member 122 of the swivel assembly 120. As shown in greater detail in FIG. 3, the top portion 132 is located above a threaded portion 133, which itself is located above the flange 135. In particular, the top portion 132 extends into, and ultimately through, a second central passage 125 formed in the swivel-bearing member 122 and the bottom portion, i.e., the height-adjusting member 124, of the swivel assembly 120. Similarly, the threaded portion 133 also extends into the second central passage 125. The threaded portion 133 engages a correspondingly threaded portion 127 of the second central passage 125, such that the spring-force-adjustable and height-adjustable spring housing 130 can be screwed into and out of engagement with the swivel assembly 120.

By rotating the swivel assembly 120 clockwise and counterclockwise (as viewed from above the mounting base 110) relative to the spring-force-adjustable and height-adjustable spring housing 130, the threaded portion 133 respectively moves axially into and out of the threaded portion 127 of the second central passage 125. This moves the spring-force-adjustable and height-adjustable spring housing 130 relatively closer to or farther away from the swivel assembly 120 and the mounting base 110, thus changing the height (e.g., the distance between the top surface of the mounting plate 110 and the contact point of the castor wheel 150) of the spring-force-adjustable and height-adjustable industrial caster wheel 100.

As shown in FIG. 3, the bottom portion 134 of the spring-force-adjustable and height-adjustable spring housing 130 includes a spring space 136 into which an elastomeric spring member assembly 160 is placed. The elastomeric spring member assembly 160 comprises an elastomeric spring member 162 and first and second rigid contact plates 164 and 166 that are attached to the elastomeric spring member 162. The first rigid contact plate 164 is provided in, on or under a bottom surface of the elastomeric spring member 162. In contrast, the second rigid contact plate 166 is provided in, on or over a top surface of the elastomeric spring member 162. The bottom portion 134 of the spring-force-adjustable and height-adjustable spring housing 130 also includes a pivot passage 138. The fastener 144 passes through the pivot passage 138, which allows the fastener 144, and thus the side plates 142, the fasteners 146 and 148 and the caster wheel 150, to pivot or rotate relative to the rest of the spring-force-adjustable and height-adjustable industrial caster wheel 100.

As shown in FIG. 3, the elastomeric spring member assembly 160 sits on the fastener or spring axel 146 within the spring space 136, with the first rigid contact plate 164 resting against the fastener or spring axel 146. In particular, the fastener or spring axel 146 rests against the first rigid contact plate 164. The elastomeric spring member 162 is deformed by the fastener or spring axel 146 bearing against the first rigid contact plate 164 when the fastener or spring axel 146 rotates upwardly or clockwise against the first rigid contact plate 164. The top edges of the side plates 142, in conjunction with the flange 135, provide a deflection stop when the spring-force-adjustable and height-adjustable industrial caster wheel 100 is under full deflection. That is, the top edges of the side plates 142 contact the flange 135 to define the full deflection of the spring-force-adjustable and height-adjustable industrial caster wheel 100.

FIG. 3 also illustrates a number of exemplary mechanisms that allow the spring force of the elastomeric spring member 162 and the height of the industrial caster wheel 100 to be adjusted independently of each other and that can be accessed from above the mounting plate 110. The spring-force adjusting mechanism 190 permits the amount of pre-loading or pre-compression/deformation of the elastomeric spring member 162 to be adjusted or changed. Similarly, the height adjusting mechanism permits the swivel assembly 120 to be readily rotated relative to the spring-force-adjustable and height-adjustable spring housing 130 and the relative positions of the swivel assembly 120 and the spring-force-adjustable and height-adjustable spring housing 130 to be secured.

As shown in FIGS. 1-3, one exemplary embodiment of a top-access height adjusting mechanism according to this invention comprises the threaded member 133 of the spring-force-adjustable and height-adjustable spring housing 130 and the swivel assembly 120, along with one or more engagable structures on each of the top portions 122 and 132. As described above, the swivel assembly 120 rotates freely relative to the mounting plate 110 and can be controllably rotated relative to the threaded member 133 to draw the threaded portion 133 into and to drive the threaded portion 133 out of the second central passage 125. As outlined above, this changes the position of the spring-force-adjustable and height-adjustable spring housing 130 relative to the swivel assembly 120 and thus the height of the spring-force-adjustable and height-adjustable industrial caster wheel 100.

As shown in FIG. 3, a first exemplary embodiment of a top-access spring force adjusting mechanism 190 according to this invention comprises a bolt 196 that is screwed into a threaded passage 193 that is formed in the recess 191 and that extends through the interior of the top portion 132 and the threaded portion 133 of the spring-force-adjustable and height-adjustable spring housing 130 into the spring space 136. The first exemplary embodiment of a top-access spring force adjusting mechanism 190 also includes a locking screw 194 that is screwed into the threaded passage 193 above the bolt 196 and down onto or against the bolt 196 to secure the bolt 196 in place so that it does not move upwardly or away from the elastomeric spring member assembly 160. The top-access spring force adjusting mechanism 190 also includes the one or more keyhole-type recesses 192 formed in the top surface of the top portion 122 of the swivel assembly 120.

When the mounting base 110 is attached to a pallet truck or the like, the spring-force-adjustable and height-adjustable industrial caster wheel 100 supports at least a portion of the load of and on the pallet truck. The swivel assembly 120 transmits this load from the mounting base 110 to the spring-force-adjustable and height-adjustable spring housing 130 through the threaded surface 127 and the threaded portion 133, the elastomeric spring member assembly 160 and the fasteners 144, 146 and 148 to the caster wheel 150. Depending on the smoothness or unevenness of the surface the pallet truck or the like is moving over and the amount of play desired, the spring-force-adjustable and height-adjustable industrial caster wheel 100 may be adjusted so that the elastomeric spring member 162 has a higher or lower spring constant, such that it provides a stiffer response to loads, such as when cornering around turns, or a springier response to loads, such as when moving over an uneven surface.

Figure 4:
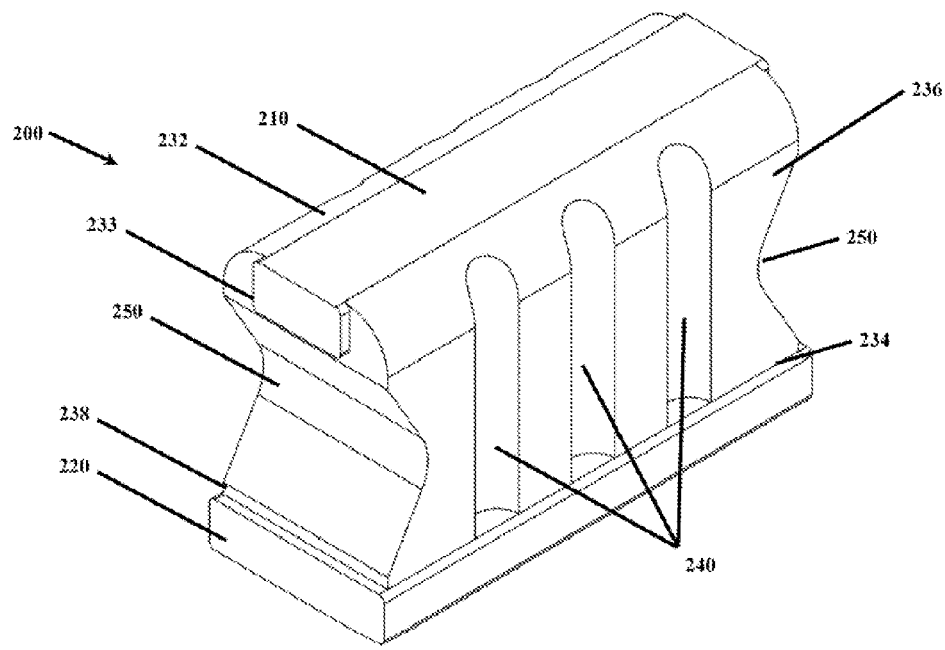
FIG. 4 is an isometric view of a first exemplary embodiment of a spring-force-adjustable spring member according to this invention.
Figure 5:
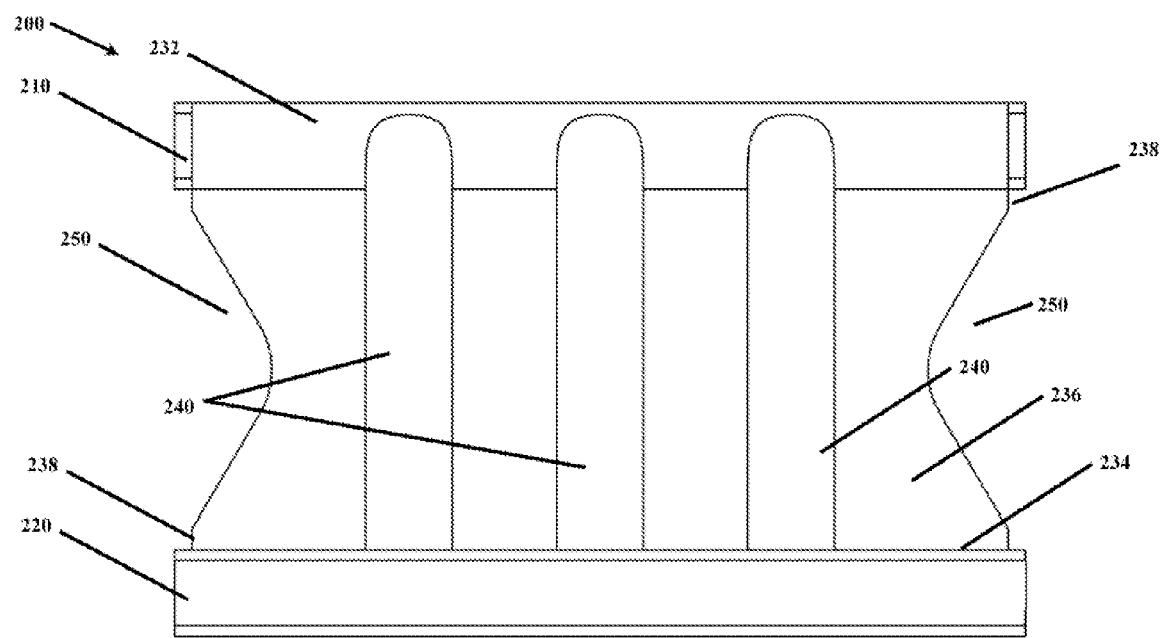
FIG. 5 is a side plan view of the spring-force-adjustable spring member shown in FIG. 4.
Figure 6:
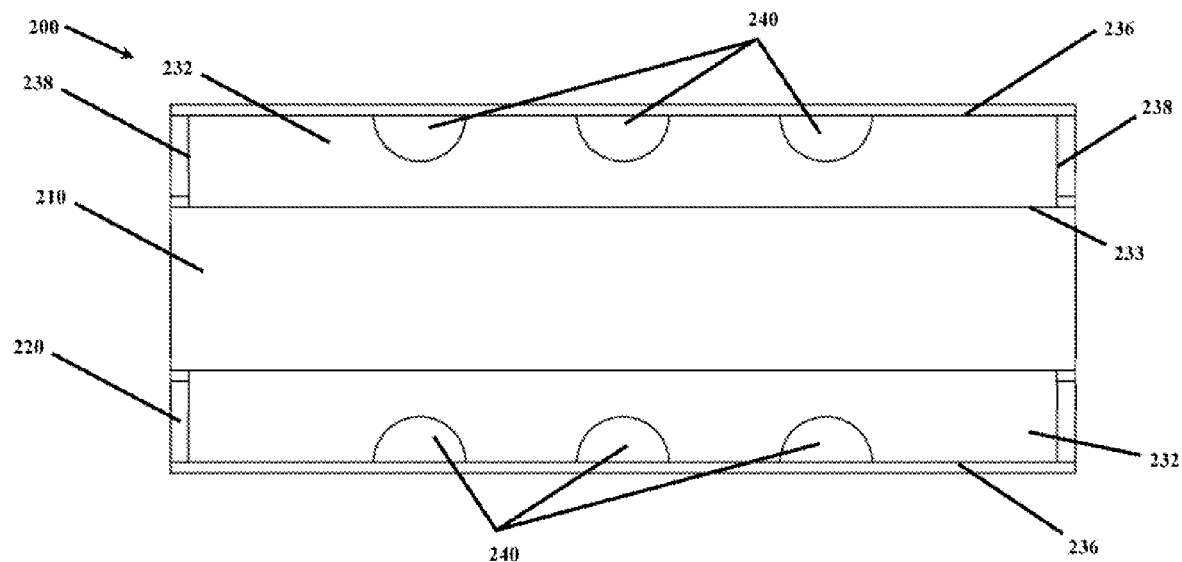
FIG. 6 is a top plan view of the spring-force-adjustable spring member shown in FIG. 4.
Figure 8:
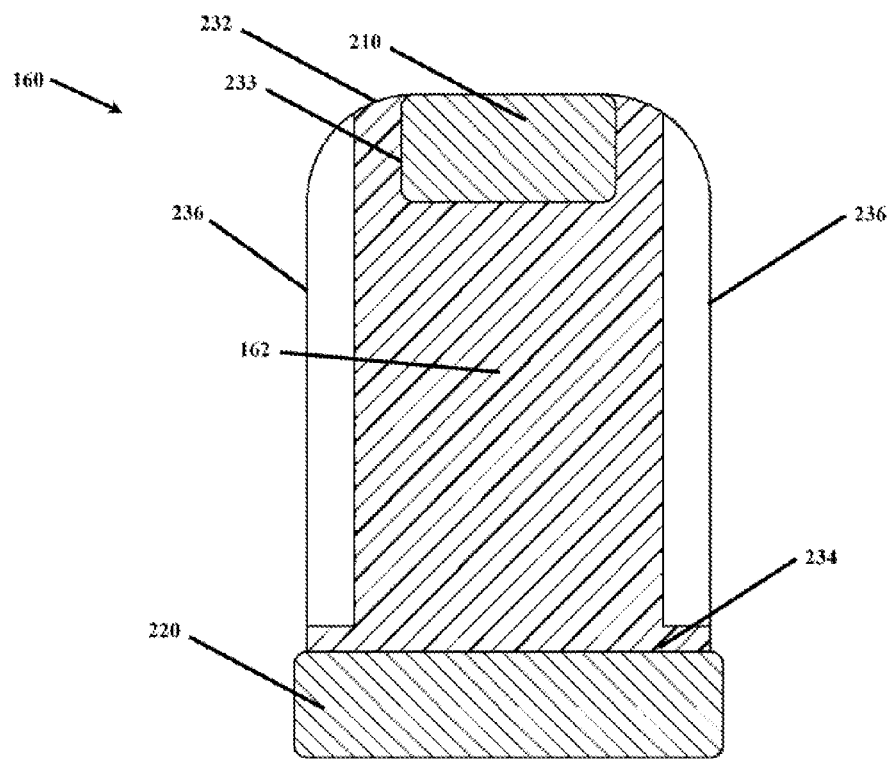
FIG. 8 is a vertical cross-sectional view through the spring-force-adjustable spring member shown in FIG. 4.
Figure 9:
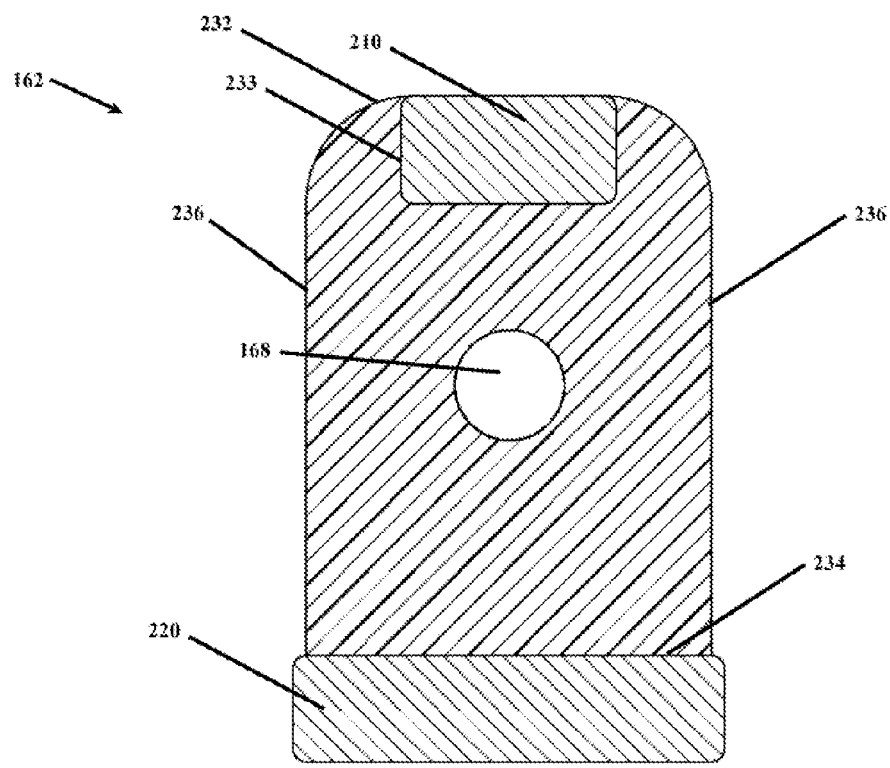

FIGS. 4-8 illustrate a first exemplary embodiment of a spring-force-adjustable spring assembly 200 according to this invention that is usable as the spring assembly 160 discussed above. In particular, FIG. 4 is an isometric view of this first exemplary spring assembly 200, while FIGS. 5-7 are side, top and end plan views, respectively, of the spring-force-adjustable spring assembly 200 shown in FIG. 4 and FIG. 8 is a vertical cross-sectional view through the spring-force-adjustable spring assembly 200 shown in FIG. 4.

As shown in FIGS. 4-8, the spring-force-adjustable spring assembly 200 includes a top bearing plate 210, a bottom bearing plate 220 and a spring member 230. The top bearing plate 210 provides a rigid bearing surface that the bolt 196 can bear against to pre-load or pre-deform the spring member 230 without damaging the soft, elastically-deformable elastomeric material used to form the spring member 230. The top bearing plate 210 also allows the spring adjustment force to be applied across the entire end-to-end width of the spring member 230. Likewise, the bottom bearing plate 220 provides a rigid bearing surface that the second fastener or spring axel 146 can bear against without damaging the soft elastically-deformable elastomeric material used to form the spring member 230. The bottom bearing plate 220 also allows the caster load to be applied across the entire end-to-end width of the spring member 230 as that load is transmitted between the caster wheel 150 and the spring assembly housing 130.

As further shown in FIGS. 4-8, the spring member 230 comprises a top surface 232, a top recess 233 formed in the top surface 232, a bottom surface 234, a pair of opposing side surfaces 236 and a pair of opposing end surfaces 238. A plurality of recesses, cut-outs or other relief areas 240 are provided in each of the pair of opposing side surfaces 236. Likewise, a recess, cut-out or other relief area 250 is provided in each of the pair of opposing end surfaces 238. As shown in FIGS. 4-8, each of the recesses, cut-outs or other relief areas 240 have a long dimension or direction that extends along the top-to-bottom direction or dimension of the spring member 230, i.e., along the direction of the applied pre-load and caster load forces. Each of the recesses, cut-outs or other relief areas 240 has a semi-cylindrical shape that extends into the spring member 230 equally along the length of the relief areas 240.

As also shown in FIGS. 4-8, each of the recesses, cut-outs or other relief areas 250 extend along the full width of the correspond end surface 238 and have a long dimension or direction that extends along the top-to-bottom direction or dimension of the spring member 230, i.e., along the direction of the applied pre-load and caster load forces. Each of the recesses, cut-outs or other relief areas 250 has a parabolic shape that extends into the spring member 230 along the end-to-end direction or dimension most deeply at or near a mid-point between the top and bottom surfaces 232 and 234 and that becomes shallower towards the along top and bottom surfaces 232 and 234.

However, it should be appreciated that the recesses, cut-outs or other relief areas 240 and/or 250 could have any desired shape, such as semi-elliptical, parabolic or hyperbolic, trapezoidal, triangular, square, rectangular or other regular or irregular polygon or portion thereof, or any other known or later developed shape. Similarly, it should be appreciated that one or more of the recesses, cut-outs or other relief areas 240, independently of the specific end-to-end shape of a particular relief area 240, could extend into the spring member 230 to varying depths in the side-to-side direction or dimension of the spring member 230. In contrast, it should be appreciated that one or more of the recesses, cut-outs or other relief areas 250, independently of the specific side-to-side shape of a particular relief area 250, could extend into the spring member 230 at a constant depth in the end-to-end direction or dimension of the spring member 230.

For example, one or more of the semi-cylindrical relief areas 240 could, in the top-to-bottom direction or dimension, be cone-shaped, hour-glass shaped, elliptically-, hyperbolically- or parabolically-shaped, or shaped in any other desired known or later-developed manner, instead of being semi-cylindrically-shaped. Moreover, different relief areas 240 could have different shapes in one or both of the end-to-end and/or side-to-side directions or dimensions, which could be based on where along the lateral width of the side surfaces 236 a given relief area 240 is located or placed. Likewise, each of the different relief areas 250 could have different shapes in one or both of the side-to-side and/or end-to-end directions or dimensions. Moreover, if two or more relief areas 250 were provided in each end surface 238, such different shape could be based on where along the lateral width of the end surfaces 238 a given relief area 250 is located or placed.

In various other exemplary embodiments of a spring member 162, instead of either or both of the relief areas 240 and/or the relief areas 250 that have their long dimension extending along the top-to-bottom direction, the relief areas on the side surfaces 236 could have their long dimensions extending along the end-to-end direction or dimension and/or the end surfaces 238 could have their long dimensions extending along the side-to-side direction or dimension. Furthermore, in various other exemplary embodiments of the spring member 230, instead of, or in addition to, either or both of the relief areas 240 and/or the relief areas 250 (and/or the alternate relief areas discussed immediately above), the spring member 230 could have one or more internal spaces or voids that form the relief areas. As discussed above with respect to the relief areas 240 and/or the relief areas 250, these internal spaces or voids could have any desired known or later developed shape.

To increase the pre-load force on spring-force-adjustable spring assembly 200 shown in FIG. 4, and thus increase its spring force by making the spring member 230 stiffer, a user turns the bolt 196 clockwise relative to the spring-force-adjustable and height-adjustable spring housing 130. The user turns the bolt 196 until the bolt 196 extends from the top surface of the spring space 136 to an extension point that corresponds to a desired amount of preloading or pre-compression/deformation of the elastomeric spring member 162.

Figure 10:
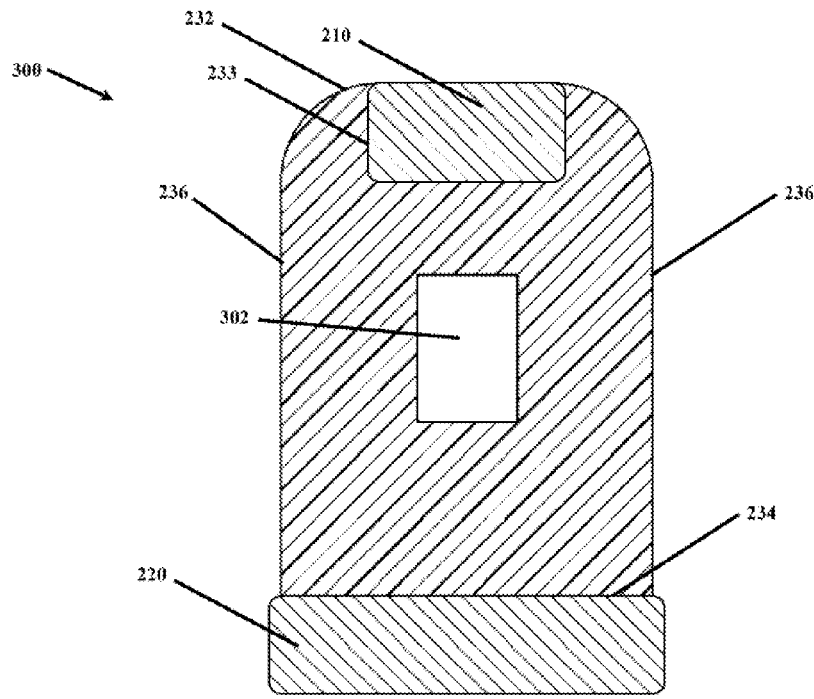

FIGS. 3 and 9-12 illustrate other exemplary embodiments of a spring-force-adjustable spring member according to this invention. For example, in FIGS. 3 and 9, the spring member 162 includes a generally cylindrical internal relief void or space 168 that extends in the end-to-end direction of the spring member 162. It should be appreciated that this internal relief void or space 168 extends within the spring member 162 over at least a significant portion of the end-to-end length of the spring member 162, and possibly extends over the entire end-to-end length of the spring member 162. In FIG. 10, a spring member 300 includes a generally rectangularly-shaped internal relief void or space 302 that extends in the end-to-end direction of the spring member 300. It should be appreciated that this internal relief void or space 302 extends within the spring member 300 over at least a significant portion of the end-to-end length of the spring member 300, and possibly extends over the entire end-to-end length of the spring member 300.

Figure 11:
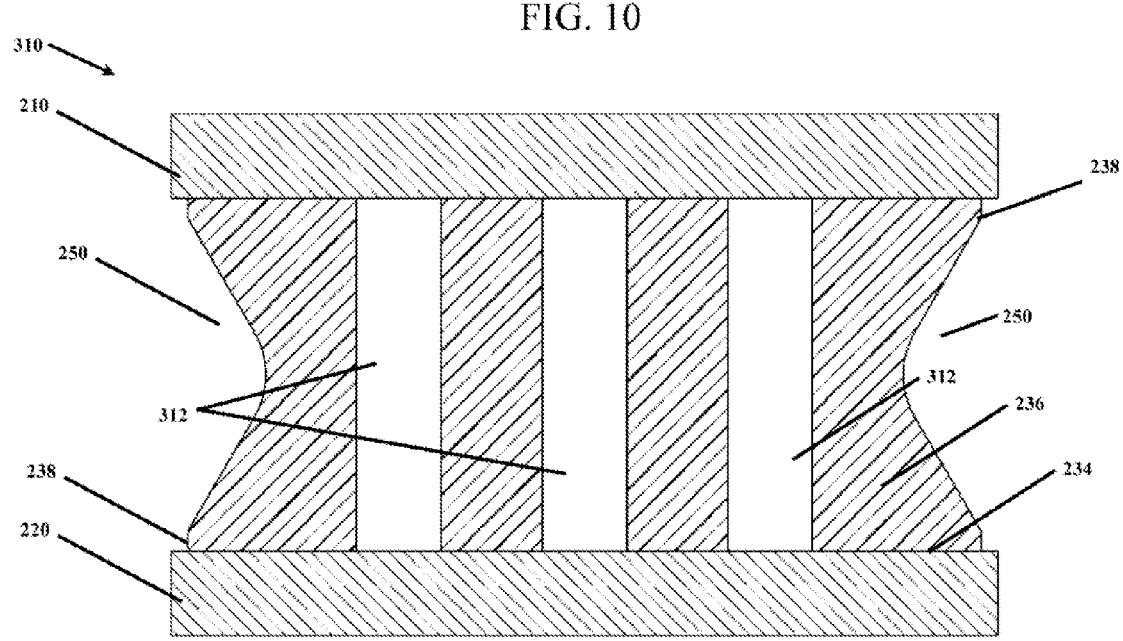

In FIG. 11, a spring member 310 includes a number of internal relief voids or spaces 312 that extend in the top-to-bottom direction of the spring member 310. It should be appreciated that these internal relief voids or spaces 312 extend within the spring member 310 over at least a significant portion of the top-to-bottom length of the spring member 310, and possibly extend over the entire top-to-bottom length of the spring member 310. Similarly, in FIG. 12, a spring member 320 includes a number of internal relief voids or spaces 322 that extend in the side-to-side direction of the spring member 320. It should be appreciated that these internal relief voids or spaces 322 extend within the spring member 320 over at least a significant portion of the side-to-side length of the spring member 320, and possibly extend over the entire side-to-side length of the spring member 320.

It should be appreciated that, in still other exemplary embodiments, a single spring member can incorporate one or more of each of the vertical or top-to-bottom internal holes or voids 312 and the side-to-side internal holes or voids 322, or one or more of each of the recesses 236 and the side-to-side internal holes or voids 322, or one or more of each of the recesses 236 and the end-to-end internal holes or voids 168, or one or more of each of the recesses 236 and vertical or top-to-bottom internal holes or voids 312. Furthermore, it should be appreciated that for each of the recesses 236, the end-to-end internal holes or voids 168, the vertical or top-to-bottom internal holes or voids 312 and the side-to-side internal holes or voids 322, any number of such recesses or internal holes or voids can be provided, rather than the numbers shown in FIGS. 3-6 and 8-12. Additionally, it should be appreciated that for each of the recesses 236, the end-to-end internal holes or voids 168, the vertical or top-to-bottom internal holes or voids 312 and the side-to-side internal holes or voids 322, such recesses or internal holes or voids can be provided having any desired appropriate shape, and in a single spring member, different ones of such recesses or internal holes or voids can have different shapes, both within a single type of recess or internal hole or void and/or between different types of recesses or internal holes or voids.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A spring assembly for an industrial caster wheel that is capable of applying an adjustable pre-load force to the spring assembly, comprising:
    an elastomeric spring member having a first surface and an opposing second surface;
    a first contact member provided on or in the first surface of the elastomeric spring member;
    a second contact member provided on or in the second surface of the elastomeric spring member; and
    at least one relief structure formed at least one of within the elastomeric spring member, in at least one surface of the elastomeric spring member, and on at least one surface of the elastomeric spring member.

2. The spring assembly of claim 1, wherein:
    when the spring assembly is combined with the industrial caster wheel, the industrial caster wheel, when in operation, applies a load force to the spring assembly;
    both the adjustable pre-load force and the load force are applied to the spring assembly between the first and second surfaces of the elastomeric spring member; and
    in response to at least one of the adjustable pre-load force and the load force being applied to the elastomeric spring member, the elastomeric spring member elastically deforms.

3. The spring assembly of claim 2, wherein, when the elastomeric spring member elastically deforms in response to the at least one of the adjustable pre-load force and the load force being applied to the elastomeric spring member, the elastomeric spring member preferentially elastically deforms at at least one of the at least one relief structure.

4. The spring assembly of claim 1, wherein at least one of the at least one relief structure is formed within a body of the elastomeric spring member.

5. The spring assembly of claim 4, wherein, for each of at least one of the at least one relief structure formed within the body of the elastomeric spring member, that relief structure is one of:
    a first void having a long dimension extending at least partially between the first and second surfaces;
    a second void having a long dimension extending at least partially between a third surface and an opposing fourth surface of the elastomeric spring member, the third and fourth surfaces of the elastomeric spring member extending at least partially between the first and second surfaces; and
    a third void having a long dimension extending at least partially between a fifth surface and an opposing sixth surface of the elastomeric spring member, the fifth and sixth surfaces of the elastomeric spring member extending at least partially between the first and second surfaces and at least partially between the third and fourth surfaces.

6. The spring assembly of claim 5, wherein:
    that relief structure has a cross-sectional shape comprising at least one of a circle, an ellipse, a triangle, a parallelogram, a trapezoid, a polygon having at least 5 sides and a closed curve having a long dimension; and
    that relief structure has a three-dimensional shape comprising at least one of a cylinder, a cone, a closed curve prism, a polygonal prism and a polygonal pyramid.

7. The spring assembly of claim 1, wherein at least one of the at least one relief structure is formed in a surface of the elastomeric spring member.

8. The spring assembly of claim 7, wherein:
    the elastomeric spring member further comprises:
        a third surface and an opposing fourth surface, the third and fourth surfaces of the elastomeric spring member extending at least partially between the first and second surfaces, and
        a fifth surface and an opposing sixth surface, the fifth and sixth surfaces of the elastomeric spring member extending at least partially between the first and second surfaces and at least partially between the third and fourth surfaces; and
    for each of at least one of the at least one relief structure formed in or on the body of the elastomeric spring member, that relief structure is one of:
        a first recess formed in one of the third and fourth surfaces of the elastomeric spring member, that first recess having a long dimension extending at least partially between the first and second surfaces,
        a second recess formed in one of the third and fourth surfaces of the elastomeric spring member, that second recess having a long dimension extending at least partially between the fifth and sixth surfaces,
        a third recess formed in one of the fifth and sixth surfaces of the elastomeric spring member, that third recess having a long dimension extending at least partially between the first and second surfaces, and
        a fourth recess formed in one of the fifth and sixth surfaces of the elastomeric spring member, that fourth recess having a long dimension extending at least partially between the third and fourth surfaces.

9. The spring assembly of claim 8, wherein that relief structure has a cross-sectional shape comprising a portion of at least one of:
 a circle, an ellipse, a triangle, a parallelogram, a trapezoid, a polygon having at least 5 sides and a closed curve having a long dimension.

10. The spring assembly of claim 8, wherein that relief structure has a three-dimensional shape comprising a portion of at least one of:
 a cylinder, a cone, a polygonal prism and a polygonal pyramid.

11. A spring-force-adjustable industrial caster wheel, comprising:
 a mounting plate usable to mount the spring-force-adjustable industrial caster wheel to a device to be at least partially supported by the spring-force-adjustable industrial caster wheel and having a first passage extending through the mounting plate;
 a spring housing that is at least indirectly pivotably connected to the mounting plate, a first surface of the spring housing accessible due to the presence of the first passage, the spring housing comprising a spring space;
 a spring-force adjusting mechanism that extends through the first surface of the spring housing and into the spring space;
 a spring assembly located within the spring space relative to the spring-force adjusting mechanism, the spring-force adjusting mechanism capable of applying an adjustable pre-load force to the spring assembly, the spring assembly comprising:
  an elastomeric spring member having a first surface and an opposing second surface,
  a first contact member provided on or in the first surface of the elastomeric spring member,
  a second contact member provided on or in the second surface of the elastomeric spring member, and
  at least one relief structure formed at least one of within the elastomeric spring member, in at least one surface of the elastomeric spring member, and on at least one surface of the elastomeric spring member;
 a pair of support plates supported by the spring housing; and
 a caster wheel, the caster wheel supported between the pair of support plates, wherein:
  when the spring-force-adjustable industrial caster wheel supports the device, a load force passes from the mounting plate to the caster wheel through the spring assembly.

12. The spring-force-adjustable industrial caster wheel of claim 11, further comprising:
 a first elongated member extending between and connecting the pair of support plates; and
 a second elongated member extending between and connecting the pair of support plates, wherein:
  the spring housing has a first passage extending between a first surface and a second opposing surface of the spring housing, the first elongated member extending through the first passage in the spring housing and supportably connecting the pair of support plates to the spring housing;
  the second elongated member extends at least into the spring space and contacts the second contact member of the spring assembly, the load force passing from the spring assembly to the caster wheel through the second elongated member, and the spring-force adjusting mechanism contacts the first contact member of the spring assembly such that both the adjustable pre-load force and the load force are applied to the spring assembly between the first and second surfaces of the elastomeric spring member; and
  in response to at least one of the adjustable pre-load force and the load force being applied to the elastomeric spring member, the elastomeric spring member elastically deforms within the spring space.

13. The spring assembly of claim 12, wherein:
 the spring assembly is closely constrained within the spring space except along an axis extending through the first and second surfaces of the elastomeric spring member; and
 when the elastomeric spring member elastically deforms in response to the at least one of the adjustable pre-load force and the load force being applied to the elastomeric spring member, the elastomeric spring member preferentially elastically deforms at at least one of the at least one relief structure.

14. The spring-force-adjustable industrial caster wheel of claim 11, wherein at least one of the at least one relief structure is formed within a body of the elastomeric spring member.

15. The spring-force-adjustable industrial caster wheel of claim 14, wherein, for each of at least one of the at least one relief structure formed within the body of the elastomeric spring member, that relief structure is one of:
 a first void having a long dimension extending at least partially between the first and second surfaces;
 a second void having a long dimension extending at least partially between a third surface and an opposing fourth surface of the elastomeric spring member, the third and fourth surfaces of the elastomeric spring member extending at least partially between the first and second surfaces; and
 a third void having a long dimension extending at least partially between a fifth surface and an opposing sixth surface of the elastomeric spring member, the fifth and sixth surfaces of the elastomeric spring member extending at least partially between the first and second surfaces and at least partially between the third and fourth surfaces.

16. The spring-force-adjustable industrial caster wheel of claim 15, wherein:
 that relief structure has a cross-sectional shape comprising at least one of a circle, an ellipse, a triangle, a parallelogram, a trapezoid, a polygon having at least 5 sides and a closed curve having a long dimension; and
 that relief structure has a three-dimensional shape comprising at least one of a cylinder, a cone, a closed curve prism, a polygonal prism and a polygonal pyramid.

17. The spring-force-adjustable industrial caster wheel of claim 11, wherein at least one of the at least one relief structure is formed in a surface of the elastomeric spring member.

18. The spring-force-adjustable industrial caster wheel of claim 17, wherein:
 the elastomeric spring member further comprises:
  a third surface and an opposing fourth surface, the third and fourth surfaces of the elastomeric spring member extending at least partially between the first and second surfaces, and
  a fifth surface and an opposing sixth surface, the fifth and sixth surfaces of the elastomeric spring member extending at least partially between the first and second surfaces and at least partially between the third and fourth surfaces; and for each of at least one of the at least one relief structure formed in or on the body of the elastomeric spring member, that relief structure is one of:
- a first recess formed in one of the third and fourth surfaces of the elastomeric spring member, that first recess having a long dimension extending at least partially between the first and second surfaces,
- a second recess formed in one of the third and fourth surfaces of the elastomeric spring member, that second recess having a long dimension extending at least partially between the fifth and sixth surfaces,
- a third recess formed in one of the fifth and sixth surfaces of the elastomeric spring member, that third recess having a long dimension extending at least partially between the first and second surfaces, and
- a fourth recess formed in one of the fifth and sixth surfaces of the elastomeric spring member, that fourth recess having a long dimension extending at least partially between the third and fourth surfaces.

19. The spring-force-adjustable industrial caster wheel of claim 18, wherein that relief structure has a cross-sectional shape across the long dimension comprising at least one of:
a portion of a circle, a portion of an ellipse, a parabola, a triangle, a parallelogram, a trapezoid, a polygon having at least 5 sides and a portion of a closed curve.

20. The spring-force-adjustable industrial caster wheel of claim 18, wherein that relief structure has cross-sectional shape along the long dimension comprising at least one of:
a rectangle, a portion of an ellipse, a parabola, a hyperbola, an hourglass, a triangle, a rectangle, a parallelogram, a trapezoid, a polygon having at least 5 sides and a portion of a closed curve.

\* \* \* \* \*